United States Patent [19]

Bleijenberg

[11] Patent Number: 4,888,543
[45] Date of Patent: Dec. 19, 1989

[54] DRIVE ARRANGEMENT, AND MOTOR-ENERGIZING SYSTEM FOR USE IN THE ARRANGEMENT

[75] Inventor: Robert Bleijenberg, Eindhoven, Netherlands

[73] Assignee: U.S. Philips Corporation, New York, N.Y.

[21] Appl. No.: 208,951

[22] Filed: Jun. 17, 1988

[30] Foreign Application Priority Data

Jun. 19, 1987 [NL] Netherlands .......... 8701438

[51] Int. Cl.$^4$ .......................................... H02P 5/40
[52] U.S. Cl. .................... 318/721; 318/687; 318/778
[58] Field of Search ............... 318/778, 779, 721–723, 318/687

[56] References Cited

U.S. PATENT DOCUMENTS

| | | | |
|---|---|---|---|
| 3,909,688 | 9/1975 | Blaschke et al. | 318/702 |
| 4,390,827 | 6/1983 | Imahashi | |
| 4,590,411 | 5/1986 | Kelly | |
| 4,746,850 | 5/1988 | Abbondanti | 318/778 |
| 4,764,712 | 8/1988 | Blaschke et al. | 318/778 |

Primary Examiner—David Smith, Jr.
Attorney, Agent, or Firm—Brian J. Wieghaus

[57] ABSTRACT

A drive arrangement is described, comprising a multiphase synchronous motor whose phase windings are energized with energizing currents whose strengths are periodic functions (f1, f2, f3) of a rotor-position or translator-position measurement value (p) which is determined by means of an incremental detection system. The drive arrangement has means for adjusting the initial position-measurement value (p) before the motor is energized with the periodic energizing currents. For determining the initial value, the phase windings are energized in different consecutive time intervals (T) with measurement alternating currents (im1, im2, im3) whose amplitudes are equal to K times the function values (f1, (ROPOS), f2(ROPOS), f3(ROPOS)) of the periodic functions (f1, f2, f3) associated with different auxiliary values (ROPOS). The frequency and amplitudes are selected in such a way that the rotor or translator performs a vibration whose vibration amplitude corresponds to only a few electrical degrees. The auxiliary value (ROPOS) is determined for which the ratio between the amplitude and the value of K is maximal and, subsequently, the initial position-measurement value (p) is adjusted to this optimum value, so that the initial value is adjusted to a value for which the force produced by the energizing currents is maximal.

13 Claims, 7 Drawing Sheets

DRIVE ARRANGEMENT, AND MOTOR-ENERGIZING SYSTEM FOR USE IN THE ARRANGEMENT

BACKGROUND OF THE INVENTION

The invention relates to a drive arrangement comprising a multi-phase linear or rotary motor of the synchronous type comprising a stator, a rotor or a translator, and at least two phase windings, an incremental rotor-position or translator-position measurement system which is responsive to detection pulses to increment or decrement, depending on the direction of movement of the rotor or the translator, a position-measurement value p, and a motor-energising system for generating in the phase windings energising currents whose values are periodic functions of the position-measurement value p, the periods of the functions corresponding to a rotor or translator displacement of 360 electrical degrees and the phase difference between the energising currents defined by the periodic functions being constant.

The invention further relates to a motor-energising system for use in the drive arrangement. Such an arrangement and system are known from U.S Pat. No. 4,390,827.

The known drive arrangement comprises a linear motor having a stator comprising a plurality of successive permanent magnets of alternate polarity and a translator having two phase windings, which translator is movable relative to the stator. The position of the translator relative to the stator is represented by the count of a digital counter in the incremental detection system. The count provides the address for two memories in which two periodic functions with a mutual phase difference of 90 degrees are stored in the form of tables. By means of multipliers a control signal, which is representative of the desired amplitude of the energising current, is multiplied by the function values appearing on the outputs of the memories. In such a drive arrangement the position of the translator magnet field generated by the phase windings relative to the stator magnet field is always dictated by the actual position of the translator. The functions are selected in such a way that the forces generated by the energising currents have maximum values which are independent of the translator position in the case of a constant value of the control signal. It is important that the position-measurement value always represents the actual translator position. In the case of a difference between the translator position as represented by the position-measurement value and the actual translator position forces smaller than said maxima will be generated.

When the drive arrangement is put into operation the position-measurement value must be brought in conformity with the actual rotor or translator position. However, in an incremental position-measurement system the actual translator position is then generally unknown. This disadvantage is frequently a reason to use an absolute position-measurement system, because in such a measurement system in the actual position is known immediately when the measurement system is switched on. However, in comparison with an incremental position-measurement system an absolute position-measurement system has the drawback of a very complex construction.

In another solution to mitigate said drawback of the incremental position-measurement system the rotor or translator is set to a known reference position before the drive arrangement is put into operation and subsequently the position-measurement value is set to a value in conformity with the known reference position.

The initial value can be set, for example, by energising the phase windings with energising currents corresponding to an arbitrary position-measurement value, causing the rotor or translator to assume a known preferred position. Subsequently, the initial value can be set by changing said arbitrary position-measurement value by a predetermined value. The initial value can also be set by operating the motor as a stepping motor or synchronous motor, to move the rotor or translator to the known reference position, for example by means of a mechanical stop, and subsequently bringing the initial value in conformity with this reference position.

The above methods of setting the initial values all have the disadvantage that during adjustment of the energisation of the motor the rotor or translator performs an uncontrolled movement. This is particularly problematic if the drive arrangement is utilized in a robot or other type of positioning system. In such positioning systems the positioning element is allowed to move only within a limited permissible operating range. However, as a result of the uncontrolled movements it is not likely that the positioning element exceeds the permissible operating range so that for example as a result of a collision between the positioning element and an object situated outside the permissible operating range, the object or the positioning element may be damaged.

Generally, linear motors are equipped with limit switches which are arranged at the stator ends and which are actuated by the translator. By means of these limit switches the energisation of the motor is interrupted as soon as the translator has reached one end of the stator. If the translator is situated in the proximity of a limit switch when the drive arrangement is put into operation an uncontrolled movement of the translator may result in the limit switch being actuated, causing the energisation to be interrupted. Such an undesired interruption can be remedied only by withdrawing the translator from the limit switch.

SUMMARY OF THE INVENTION

It is the object of the invention to provide a drive arrangement as defined in the opening paragraph in which the incremental position-measurement system is set to a correct initial position-measurement value without the occurrence of uncontrolled rotor or translator movements. In accordance with the invention this object is achieved in that the motor-energising system comprises adjustment means for adjusting the position-measurement value to an initial value in a time interval before the motor-energising system is put into position, for which initial value the energising currents defined by said initial value produce a maximal force, for which purpose the adjustment means comprise signal-generating means for generating measurement alternating currents in the phase windings, in successive time intervals, which measurement alternating currents have amplitudes equal to K times the function values of the periodic functions for a plurality of different auxiliary values to impose on a rotor or translator vibrations of amplitudes which are small relative to the period of the periodic functions, and means for determining the optimum auxiliary value for which the ratio between the amplitude of the vibration and K is maximal in the case of a predetermined relationship between the signs of the measurement alternating currents and the directions of the forces generated by said currents, and for adjusting the initial position-measurement value p to the optimum auxiliary value thus determined. During adjustment of the initial position-measurement value in the drive arrangement in accordance with the invention the rotor or translator only performs a vibration whose amplitude is negligible relative to the distance corresponding to the period of the periodic functions, so that during the adjustment of the initial value the rotor or translator is not displaced significantly in comparison with the displacement to the preferred position if the energisation is switched on in the case of an arbitrary position-measurement value.

An embodiment of the drive arrangement is characterized in that the adjustment means are adapted to determine the auxiliary value for which the ratio between the amplitude of the vibration and K is minimal and, subsequently, to determine the initial position measurement value by changing said auxiliary value by a value corresponding to a rotor or translator displacement of ninety electrical degrees. As in the proximity of the minimum of said ratio the change of the said ratio as a function of the auxiliary value is maximal, the auxiliary value corresponding to said minimum can be determined very accurately. Since the difference between the initial position-measurement value and the position-measurement value corresponding to the minimum ratio corresponds to ninety electrical degrees adaptation of the last-mentioned position-measurement value enables a very accurate optimum position-measurement value to be obtained.

A further embodiment of the drive arrangement which is characterized in that the adjustment means are adapted to iteratively determine the optimum auxiliary value, has the advantage that the optimum position-measurement value is obtained within a very short time. In such a drive arrangement the difference between the auxiliary value defining the amplitude of the measurement alternating currents and the final auxiliary value decreases as the number of iteration steps increases, with the result that the ratio between the amplitude of the vibration and the value of K also decreases. An embodiment of the drive arrangement, which is characterized in that the adjustment means are adapted to increment the value of K as the ratio between the amplitude of the vibration and the value of K decreases, therefore has the advantage that the amplitude of the vibrations always remain small.

The invention and further advantages thereof will now be described in more detail, by way of example, with reference to FIGS. 1 to 10, of which

DESCRIPTION OF THE PREFERRED EMBODIMENTS

Figure 1:
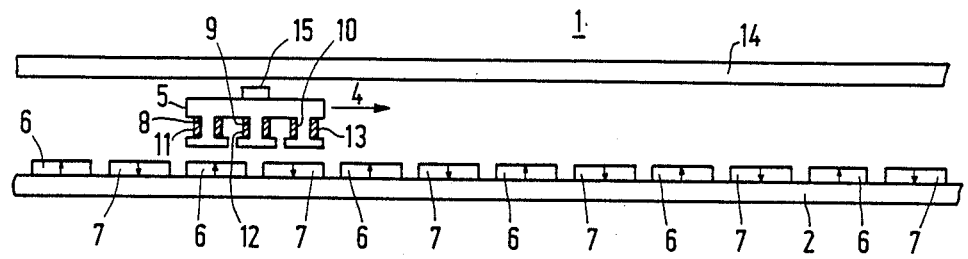
FIG. 1 is a diagrammatic cross-sectional view of a linear multi-phase synchronous motor of a customary type.

FIG. 1 is a diagrammatic cross-sectional view of a multi-phase synchronous linear motor 1 of a customary type. The motor 1 has a stator 2 and a translator 5 which is movable relative to the stator 2 in the direction indicated by an arrow 4. The stator 2 comprises a number of permanent-magnetic north poles 6 which alternate with a number of magnetic south poles 7. The translator 5 comprises teeth 8, 9 and 10 with shoe-shaped ends facing the stator. Phase windings 11, 12 and 13 are arranged on the teeth 8, 9 and 10 respectively. For determining the position of the translator 5 the motor 1 comprises an optical ruler of a customary type, comprising an elongate strip 14 with equidistant marks (not shown). Opposite the strip 14 an optical detector 15 is secured to the translator 5 for the detection of said marks. In response to the detection of the marks the optical detector 15 supplies first and second pulse-shaped Vp1 and Vp2 of a frequency proportional to the velocity with which the translator 5 moves relative to the stator 2. Depending on the direction of movement of the translator 5 the phase difference between the first and second pulse-shaped signal is ninety or two hundred and seventy degrees. An example of such an optical ruler and optical detector is described comprehensively in European patent application No. 0,074,767 which corresponds to U.S Pat. No. 4,590,411.

Figure 2:
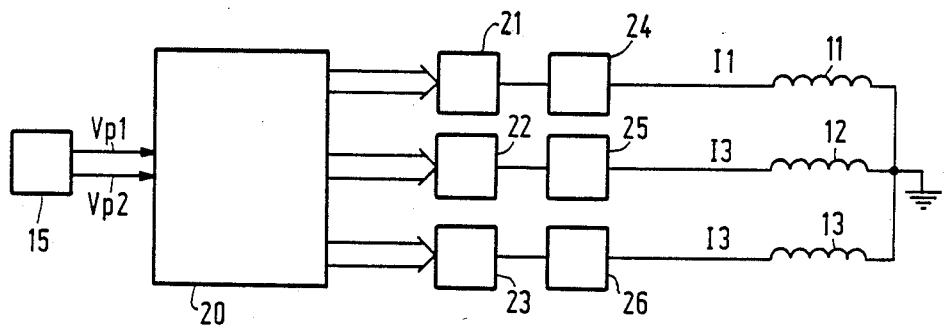
FIG. 2 shows an embodiment of the drive arrangement in accordance with the invention.

The pulse-shaped signals Vp1 and Vp2 are applied to a digital computer 20 of a customary type (see FIG. 2). The computer 20 is loaded with a position-measurement program of a customary type for incrementing or decrementing a position-measurement value p by a correction value in response to pulses of the pulse-shaped signals Vp1 and Vp2 and depending on the direction indicated the phase difference between the signals Vp1 and Vp2. The strip 14, the optical detector 15 and the computer 20 together constitutes an incremental translator-position measurement system.

Further, the computer 20 is loaded with an energising-current determining program for computing the desired values ig1, ig2 and ig3 of the energising currents I1, I2 and I3 for the phase windings 11, 12 and 13 in accordance with periodic functions f1, f2 and f3 of the position-measurement value p. Such periodic functions may comprise, for example, sinusoidal functions as defined by the following relations (1). However, in principle other periodic functions such as periodic rectangular or trapezoidal functions are also suitable.

$$
\begin{aligned}
ig1 &= f1\,(p) - u\sin p \\
ig2 &= f2\,(p) - u\sin(p+120) \\
ig3 &= f3\,(p) - u\sin(p+240)
\end{aligned} \quad (1)
$$

In the relations (1) u is a measure of the desired amplitude of the energising currents. The computed values of ig1, ig2 and ig3 in the form of digital codes are applied to the respective digital-to-analog converters 21, 22 and 23 to convert these digital codes into analog signals which are representative of the desired values of the energising currents. These analog signals are applied to amplifier circuits 24, 25 and 26 for generating energising currents I1, I2 and I3 for the phase windings 11, 12 and 13, the values of these currents corresponding to the desired values ig1, ig2 and ig3 represented by the analog signals. The computer 20 together with the digital-to-analog converters 21, 22 and 23 in the amplifier circuits 24, 25 and 26 forms a motor-energising system for a three-phase synchronous motor whose phase windings 11, 12 and 13 are energised with currents I1, I2 and I3 which are periodic functions (relations (1)) of the position-measurement value p. The incremental position-measurement value is scaled in such a way that the period of the periodic functions correspond to a translator displacement of three hundred and sixty electrical degrees. In the three-phase synchronous motor shown here the forces produced by the currents I1, I2 and I3 may be represented by the following relations:

$$
\begin{aligned}
F1 &= c.u.\sin(p)\sin(p^*) \\
F2 &= c.u.\sin(p+120)\sin(p^*+120) \\
F3 &= c.u.\sin(p+240)\sin(p^*+240)
\end{aligned}
$$

where p* indicates the actual position of the translator relative to the stator and c is a motor constant indicating the ratio between the current and the force produced by this current.

Figure 4:
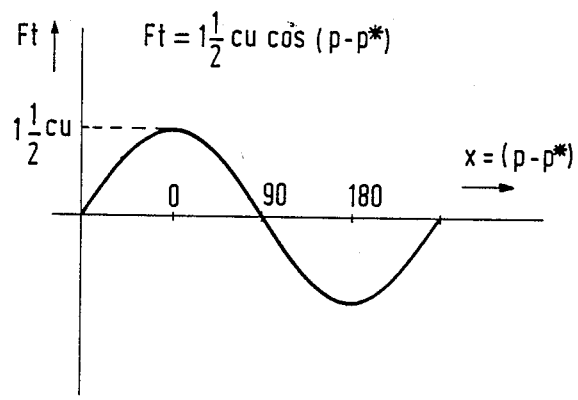
FIG. 4 shows the sum Ft as a function of the difference between the position-measurement value P and the actual translator position p*.
Figure 3:
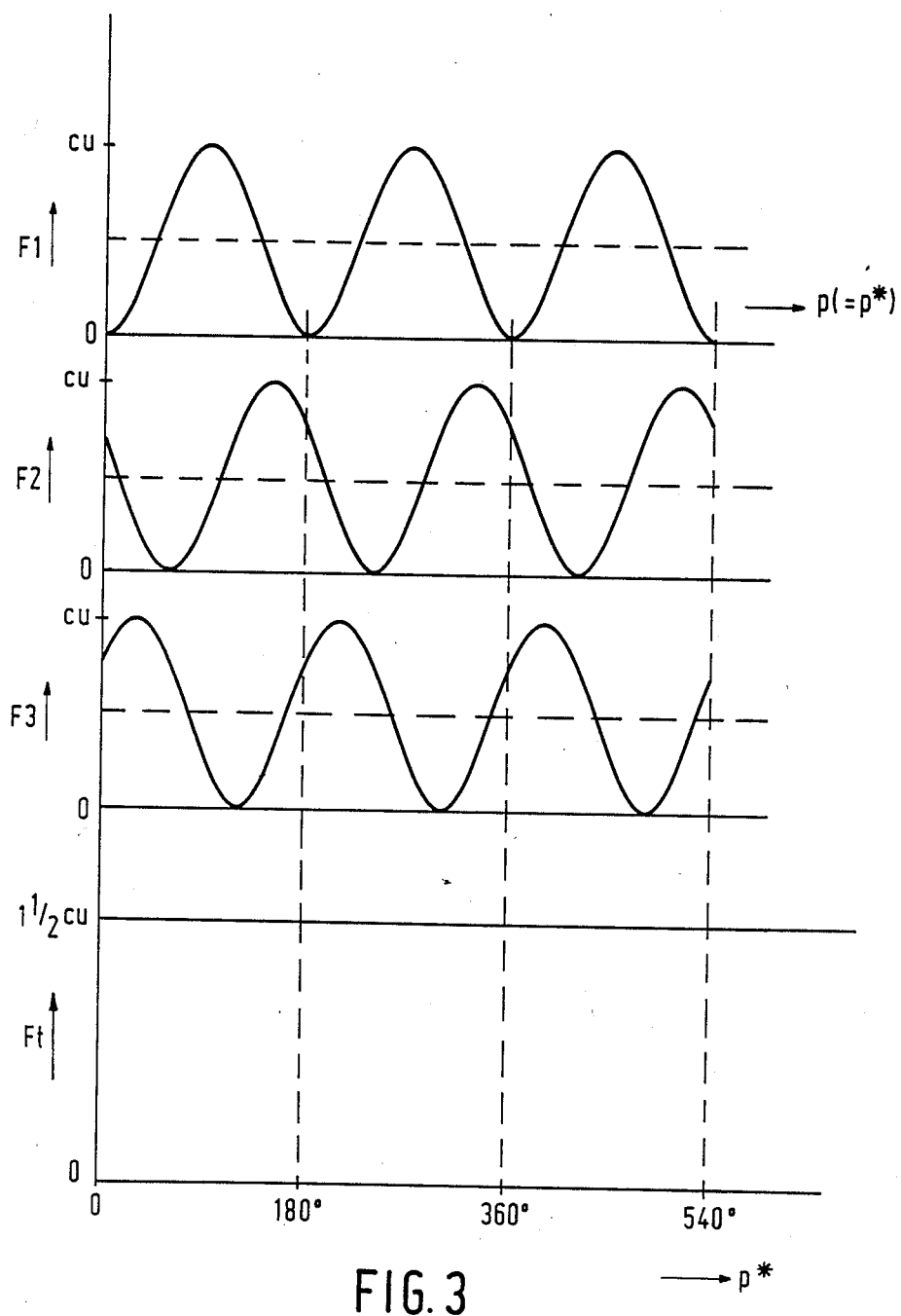
FIG. 3 shows the F1, F2, F3 generated by the energising currents and the sum Ft of these forces as a function of the position-measurement value p.

FIG. 3 gives the forces F1, F2 and F3 as a function of the position-measurement value p when p is equal to p*. Moreover, FIG. 3 gives the sum Ft of the forces F1, F2 and F3. As is apparent from FIG. 3 the sum Ft of the forces is independent of the translator position p*. FIG. 4 shows the effect on the sum Ft of the forces, if the position-measurement value p exhibits a deviation relative to the actual translator position p*.

From FIG. 4 it is evident that for optimum force generation by the linear motor it is important that the difference between p and p* is equal to zero or a multiple of 360 electrical degrees. Since an incremental position-measurement system only detects positional changes relative to an initial value, it is necessary for an optimum operation of the motor 1 that before the motor-energising system is put into operation the position-measurement value p is adjusted to a value for which the sum force Ft is maximal. The computer 20 is loaded with an adjustment program for adjusting the initial position-measurement value, which program is carried out before the motor-energising system is put into operation by calling the energising-current-determining program.

An embodiment of the drive arrangement in accordance with the invention, in which during adjustment of the position-measurement value the translator moves only over a distance corresponding to a few electrical degrees will now be described hereinafter. The phase windings 11, 12 and 13 are then energised with measurement alternating currents im1, im2 and im3 whose amplitudes are equal to K.f1(ROPOS), K.f2 (ROPOS) and K.f3(ROPOS), in which ROPOS is an auxiliary variable corresponding to a specific rotor function and in which the functions f1, f2 and f3 correspond to the functions f1, f2 and f3 defined by the relations (1), and where K is a gain factor. The forces generated by the measurement alternating currents im1, im2 and im3 cause the translator to vibrate. The amplitudes and frequencies of the measurement alternating currents im1, im2 and im3 have been selected in such a way that the amplitude of the translator vibration corresponds to only a few electrical degrees. The ratio between the measurement alternating currents im1, im2 and im3 and the resulting forces may then be regarded to be constant within the vibration range, so that the translator 5 is subject to a force Fm of constant amplitude Fm and alternating sign, the amplitude Fm of the force being equal to 3/2 C.K. cos (ROPOS−p*).

Figure 5:
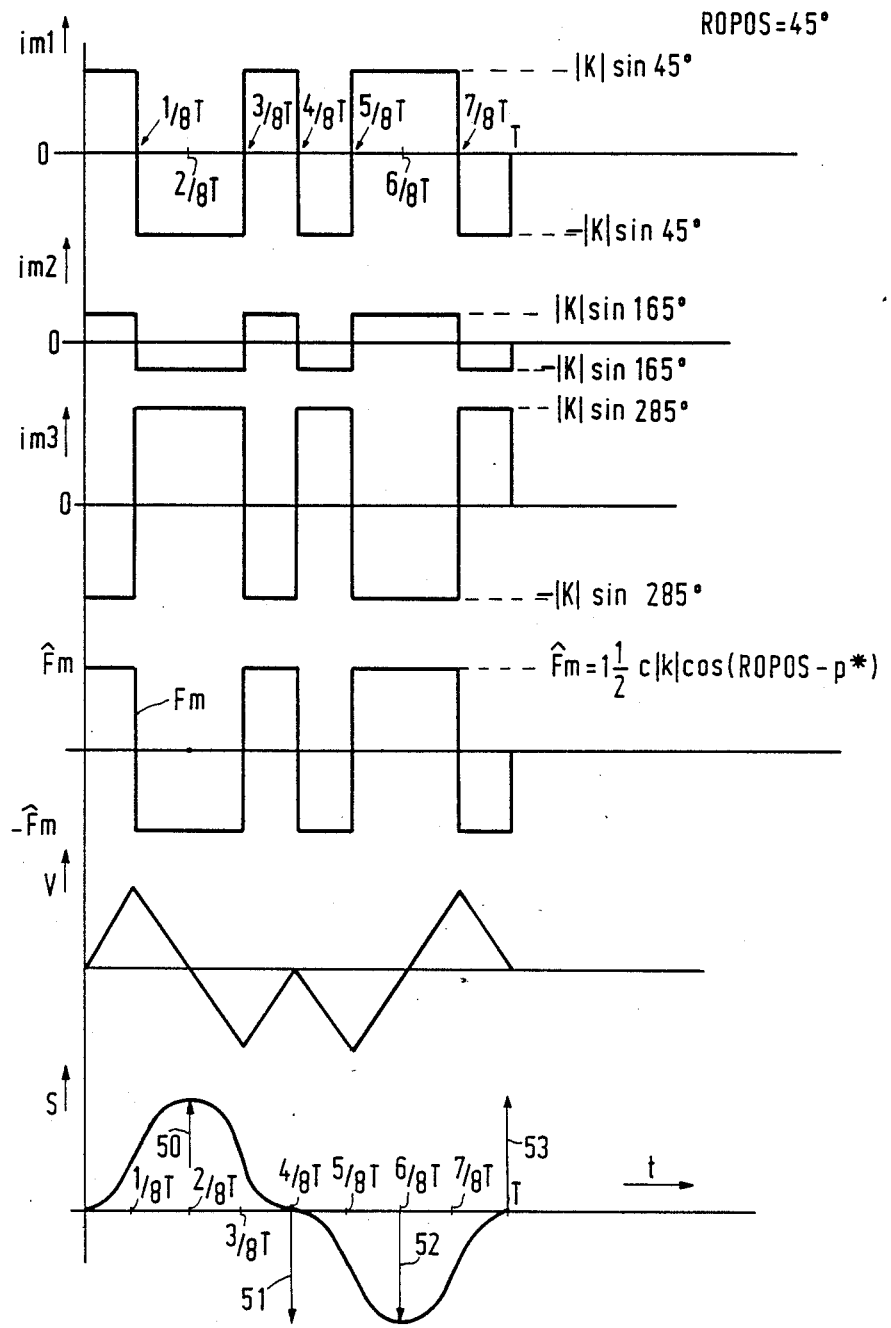
FIG. 5 shows the measurement alternating currents im1, im2, im3, the force Fm produced by said currents, the translator velocity V and the translator displacement S as a function of time.

FIG. 5 shows suitable waveforms for the alternating currents im1, im2 and im3, the forces Fm produced by these currents, the translator velocity V and the translator displacement S as a function of time t for a value of ROPOS corresponding to forty-five electrical degrees. It is to be noted that, in principle, it is alternatively possible to use other waveforms for the measurement alternating currents im1, im2 and im3, for example sine-waves. By energising the phase windings 11, 12 and 13 in consecutive intervals T with measurement alternating currents im1, im2, and im3 which correspond to different values of ROPOS and at the same time determining the amplitudes of the translator vibrations caused by these currents, it is possible to find the value of ROPOS for which the ratio between the amplitude of the translator vibration and K, and consequently the ratio between Fm and K, is maximal. This value of ROPOS corresponds to the optimum initial value for the position-measurement value p.

Figure 6:
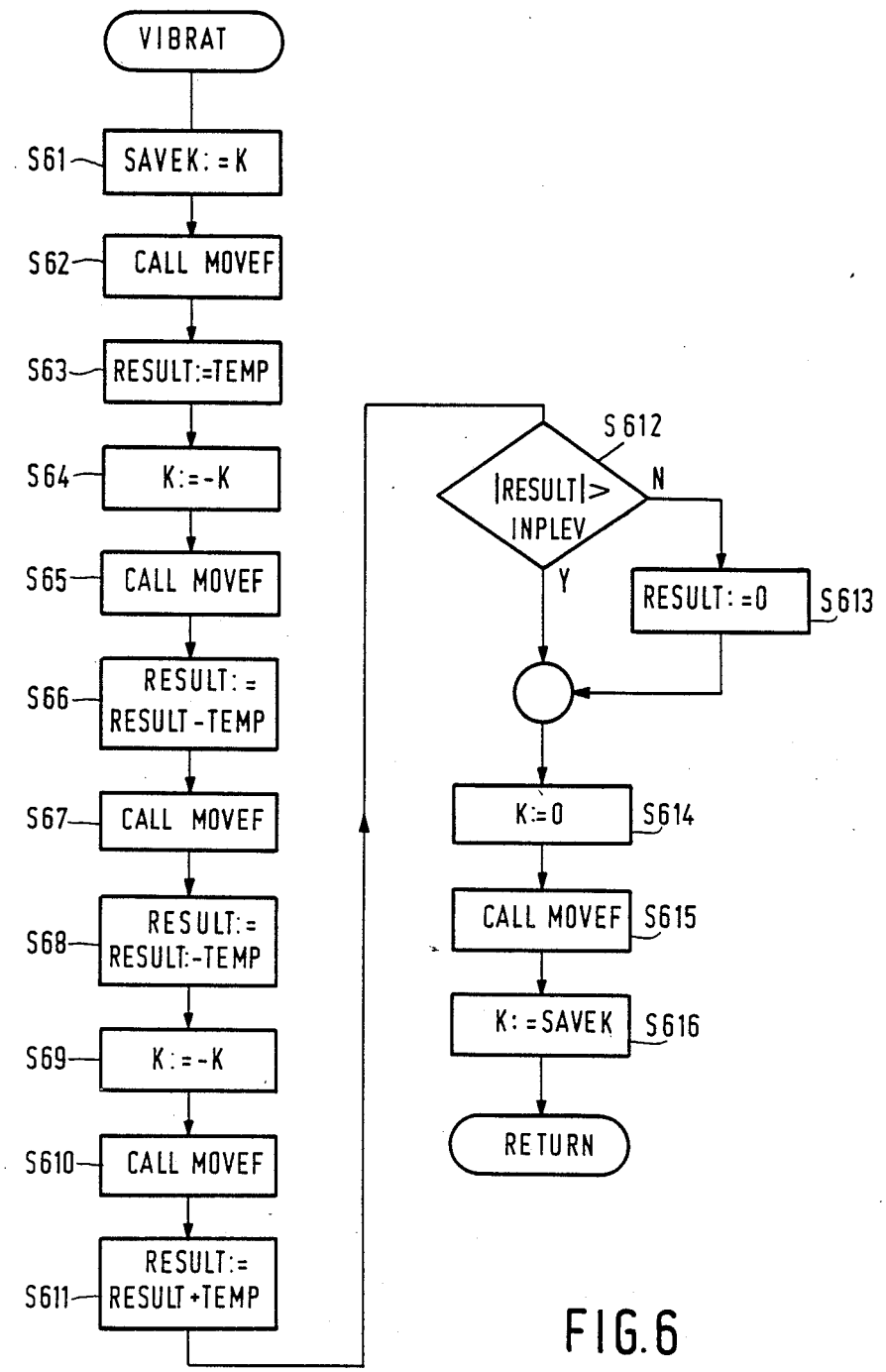
FIG. 6 is the flow chart of a subroutine VIBRAI for generating the measurement alternating currents im1, im2 and im3 shown in FIG. 5.
Figure 7:
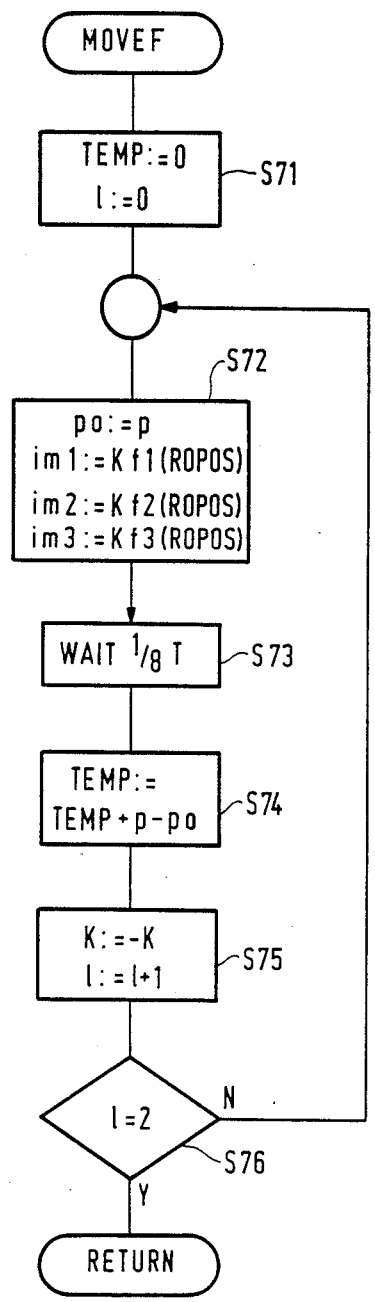
FIG. 7 is the flow chart of a subroutine MOVEF called during execution of the subroutine VIBRAT.
Figure 9:
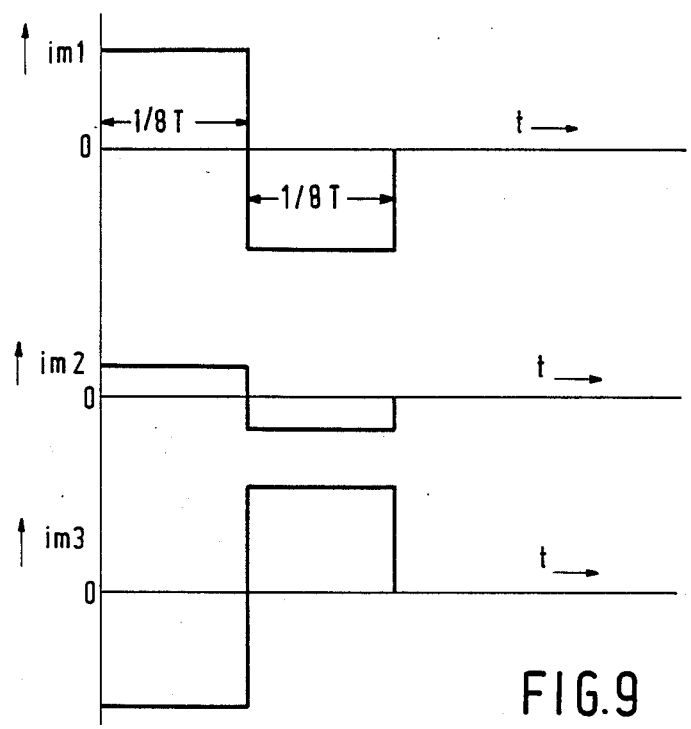
FIG. 9 shows the measurement alternating currents im1, im2 and im3 determined during the subroutine MOVEF as a function of time.

FIG. 6 and FIG. 7 by way of example show a flow chart of a program for generating the measurement alternating currents im1, im2 and im3 having the waveforms shown in FIG. 5. The program comprises a subroutine MOVEF (FIG. 7) for generating the measurement alternating currents im1, im2 and im3 during a first time interval equal to ⅓ T, followed by a second time interval of ⅓ T, in which the polarity of the measurement alternating currents im1, im2 and im3 is opposite to the polarity in the first time interval (see FIG. 9). Moreover, during this period a measure TEMP of the translator displacement during this period is determined. For this purpose the subroutine MOVEF comprises a number of program steps S71 ... S76, step S71 being an initializing step in which the value TEMP and an auxiliary variable in the form of the integer 1 are set to zero. Subsequently, in step S72, the variable po equalized to the instantaneous position-measurement value p. Moreover, in step S72 the value of im1, im2 and im3 is derived from the value of K and of ROPOS in conformity with the following relations im1 = K. f1 (ROPOS)
im2 = K. f2 (ROPOS)
im3 = K. f3 (ROPOS)

Moreover, the values of im1, im2 and im3 are applied to the digital-to-analog converters 24, 25 and 26 to energise the phase windings with measurement alternating currents corresponding to these values of im1, im2 and im3. The step S72 is followed by the step S73, in which a waiting time of ⅓ T is observed before the step S74 is carried out. During this time interval the values of the currents im1, im2 and im3 remain constant. During the step S74 the value of TEMP is incremented by the value p−po, which value represents the displacement of the translator during the waiting time of ¼ T. Subsequently, the value of K is inverted during the step S75, after which the steps S72, S73 and S74 are repeated with an inverted value of K. In the subroutine VIBRAT (see FIG. 6) the subroutine MOVEF is called four times during the steps S62, S65, S67 and S610, the value of K being inverted after the first call (S62) and the third call (S67), during the steps S64 and S69 respectively. This results in the measurement alternating currents im1, im2 and im3 as shown in FIG. 5.

The value of TEMP indicating the translator displacement during the subroutine MOVEF for the first, the second, the third and fourth call is indicated by the vectors 50, 51, 52 and 53 respectively in FIG. 5. It is to be noted that the values of TEMP after the second and the third call of MOVEF are opposite to the values of TEMP after the first and fourth call of MOVEF. During the steps S63, S66, S68 and S69 a measure RESULT of the amplitude of the translator vibration is derived from the values TEMP by incrementing the value RESULT by the value of TEMP in steps S63 and S69 and by decrementing the value RESULT by the value of TEMP in steps S66 and S68. If the force produced by the measurement currents im1, im2 and im3 is only slightly higher than the friction forces, the translator will move but the value of RESULT is then unreliable.

Figure 8A:
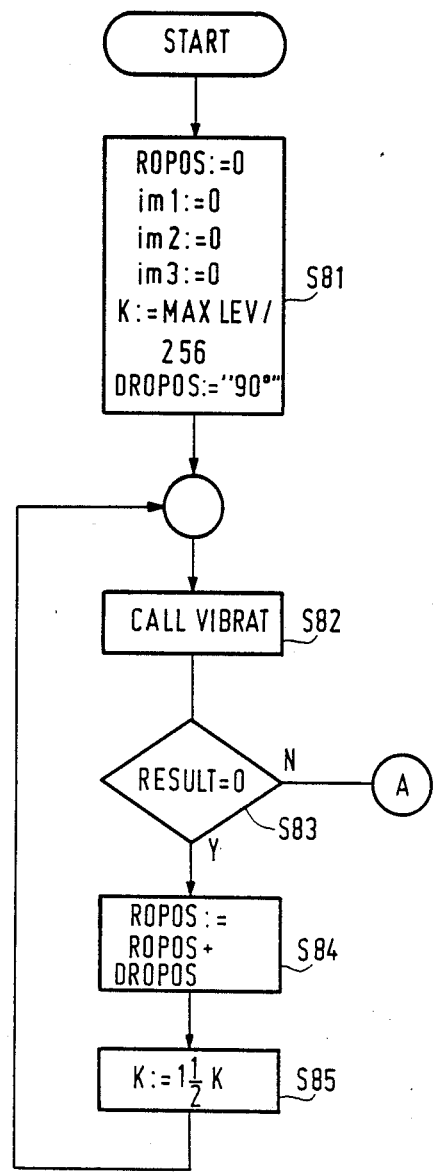
FIGS. 8a and 8b are flow charts of an adjustment program for optimising the initial position-measurement value.
Figure 8B:
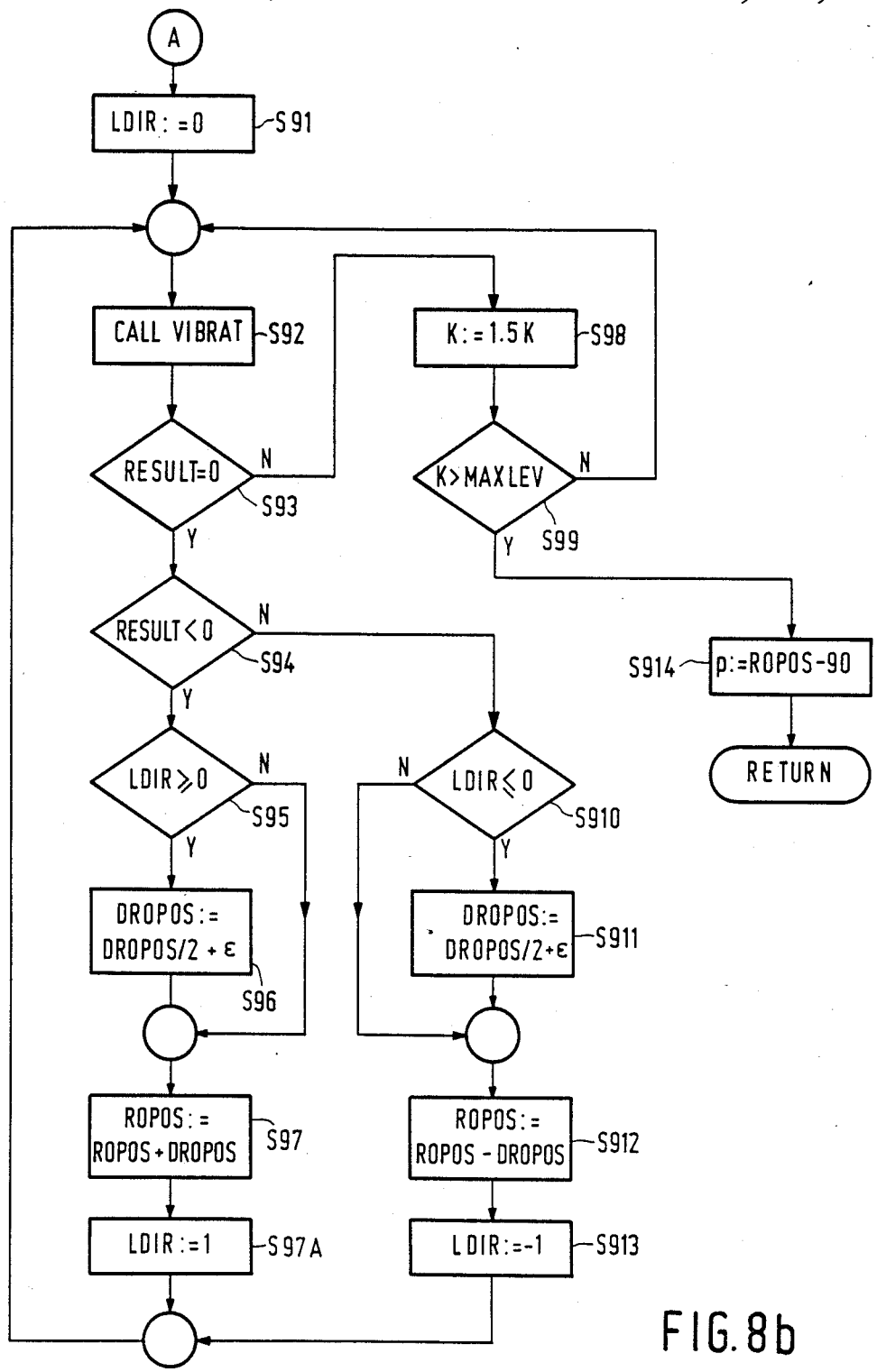

In order to prevent wrong decisions from being taken on the basis of said unreliable values, the value of RESULT is made equal to zero in step S612 and S613 if this value does not exceed a specific threshold value INPLEV. Moreover, in the step S614 the value of K is equalised to zero by means of TEMP and the subroutine MOVEF is called in step S615, so that the currents in the phase windings remain zero for a time interval of ¼ T. Subsequently, K is restored to its original value (S616) and the subroutine VIBRAT is terminated. FIGS. 8a 8b shows the flow charts of an example of an adjustment program for adjusting the initial position-measurement value p, which adjustment program utilizes the sub-routine VIBRAT for generating the measurement alternating currents im1, im2 and im3 corresponding to the value of ROPOS determined in the adjustment program and for determining the amplitude of the resulting translator vibration, which amplitude is represented by the variable RESULT. The adjustment program comprises two sub-programs, of which the first program comprises the program steps S81, . . . , S88 (FIG. 8a) and of which the second sub-program comprises the program steps S91, . . . , S914 (FIG. 8b). During the first sub-program the values for K and for ROPOS are searched for which the motor responds, i.e. for which a translator vibration is detected upon energisation with measurement alternating currents im1, im2 and im3 dictated by the values of K and ROPOS. In order to prevent the translator 5 from performing vibrations of undesirably high amplitude at the very beginning of the search process, this process begins with small values K, resulting in small values of the measurement alternating currents im1, im2 and im3. The initial value of ROPOS is selected to be zero (S81). Moreover, a correction value DROPOS is set to a value corresponding to 90° el. during S81.

The first sub-program includes a program loop which comprises the steps S82, . . . , S85. Each time that this program is traversed the subroutine VIBRAT is called first, so that measurement alternating currents im1, im2 and im3 are generated in the phase windings 11, 12, and 13, the values of these currents being prescribed by the instantaneous values of K and ROPOS. Moreover, during VIBRAT the value of RESULT, representing the amplitude of the vibration produced by the measurement alternating currents, is determined. If during S84 the value of RESULT indicates that a translator vibration has occurred, the first sub-program is abandoned and the first program step S91 of the second sub-program is carried out. However, if the value of RESULT indicates that no translator vibration has occurred, for example because the force exerted by the measurement alternating currents is smaller than the friction force, the value of ROPOS is increased by the correction value DROPOS and the value of K is incremented. Subsequently, the subroutine VIBRAT is called again with the new values for ROPOS and K.

Figure 10:
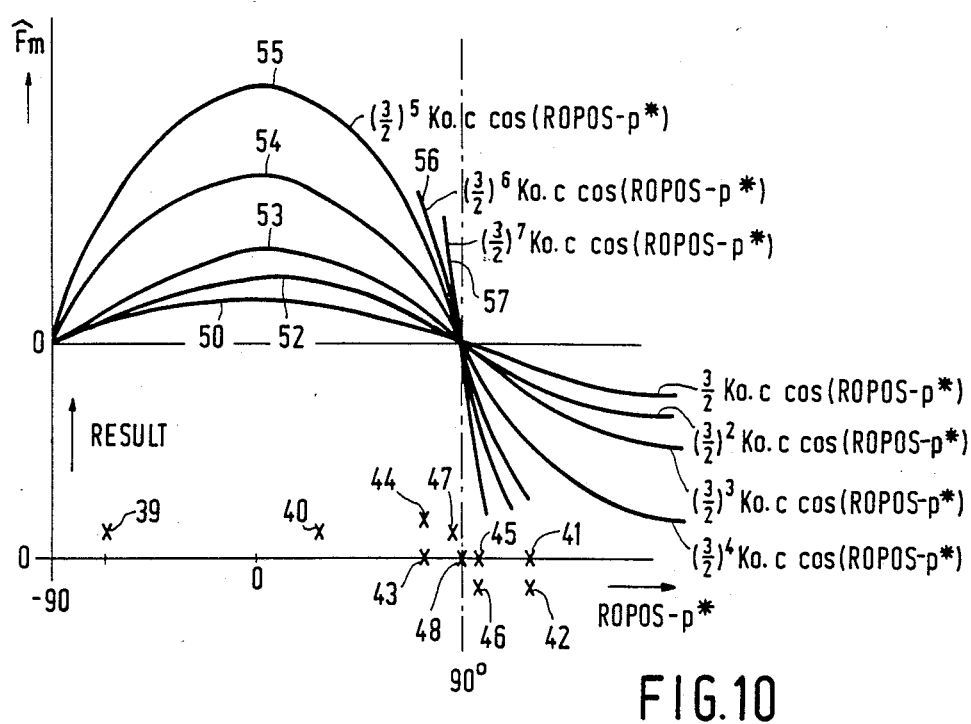
FIG. 10 shows the variations of the variable ROPOS, the variable RESULT and the force Ft generated by the measurement alternating currents during the adjustment program to explain this program.

As described in the foregoing, the first sub-program is abandoned and the second sub-program is carried out as soon as a translator vibration is detected during the step S84. During the second sub-program, whose flow chart is given in FIG. 8b, that value of ROPOS is determined for which the ratio between the vibration amplitude and the value of K is minimal. The second sub-program will now be explained by means of an example. First of all, at the beginning of the second sub-program, the variable LDIR is made equal to zero during S91. Said variable LDIR serves to indicate the sign of the previous value of RESULT. After the step S91 the subroutine VIBRAT is called with the last value determined for K and ROPOS. In FIG. 10 the value of K, the difference and ROPOS−p* at the beginning of the second sub-program are indicated by point 39. Hereinafter the value of K at the beginning of the second sub-program will be referred to briefly as Ko. For this value Ko of K the variation of the amplitude Fm of the force Fm for the values of im1, im2 and im3 defined by this value Ko as a function of ROPOS−p* is indicated by the function bearing the reference numeral 50 in FIG. 10. It is assumed that at the beginning of the second sub-program the difference ROPOS−p* and the value of RESULT determined in step S92 correspond to the values indicated by point 39 in FIG. 10. After the test steps S93, S94 and S95 the computer 20 will then proceed with the step S97, in which the value of ROPOS is increased by the correction value DROPOS. Moreover, during the step S97 the value of LDIR is adapted, after which in step S92 the subroutine VIBRAT is called again with the new value of ROPOS. If, as is indicated in FIG. 10, the new value of ROPOS−p* is still smaller than 90 degree, the value of RESULT indicated by point 40 will still be positive after the subroutine VIBRAT.

Since the value of RESULT and the value of LDIR are both positive, the value of ROPOS will again be increased by the correction value DROPOS in step S97 after the test steps S93, S94 and S95. Subsequently, the subroutine VIBRAT with the new value of ROPOS will be called. However, now the volume of RESULT is found to be zero (see point 41) because, for example, the force Fm exerted on the translator has decreased to such an extent that the friction can no longer be overcome. In that case the value of K is incremented in step S98 and the sub-routine VIBRAT is called again for the incremented value of K (the variation of the amplitude Fm of the force Fm for the incremented value is indicated by reference numeral 52). Now it appears that the force exerted on the translator has increased so far that a translator vibration occurs and, consequently, a non-zero value is obtained for RESULT (see point 42). As the difference ROPOS−p* corresponds to a value greater than 90 degrees, the sign of the force Fm has changed, so that the value of RESULT becomes negative.

After the test steps S93 and S94 the test step S910 is carried out. During this test step a change in sign of LDIR is detected, after which the correction value is decremented in step S911 and subsequently the value of DROPOS is reduced by said decremented value of DROPOS in step S912. Moreover, the value of LDIR is adapted in step S913, after which the subroutine VIBRAT is called again. The value of RESULT now appears to be zero (see point 43), so that the value of K is incremented again during the step S98. The variation of Fm for this new value of K is represented by the function 53. After incrementation of the value of K in step S98 the positive value for RESULT indicated by point 44 is found, after which the value DROPOS is decremented again in step S96 and the value of ROPOS is increased by said decremented value in step S97. After calling of the subroutine VIBRAT the value of RESULT is found to have the value zero as indicated by point 45, so that the value of K is incremented again (the variation of Fm for the new value of K is indicated by the reference numeral 54). After calling of the subroutine VIBRAT with the incremented value of K, the value of RESULT is negative (point 47). The value of DROPOS is decremented again and the subroutine VIBRAT is called again with a value of ROPOS adapted by the decremented value of DROPOS. The value of RESULT is now positive again (point 47), so that the value of DROPOS is decremented again. The value of ROPOS adapted by said new value of DROPOS is indicated by point 48. The difference between DROPOS and p* has now become substantially equal to 90°, which means that the forces exerted by the measurement currents im1, im2 and im3 have become substantially zero. The value of RESULT is then also zero after the subroutine VIBRAT has been called. Subsequently, the program loop comprising the steps S98, S99, S92 and S93 is traversed several times, the value of K being incremented each time (the variation of Fm for consecutive incrementations of K is indicated by the reference numerals 55, 56 and 57). Since the ratio between the force Fm and the value of K is now substantially zero for the value reached for ROPOS, the value of RESULT will remain zero. The program loop is interrupted at the instant at which the value of K exceeds a maximum value MAXLEV (S99).

When the program loop is left, the difference between ROPOS and p* corresponds to 90 electrical degrees. The initial position measurement value p which must be equal to the value of p* can then be determined simply in step S914 by reducing the value of ROPOS by 90 degrees, after which the adjustment program may be abandoned.

In the adjustment program described hereinbefore the value of K is initially small and is incremented as the value of ROPOS−p* more closely approximates to the final value. It will be obvious that this is not necessary, but that it is for example also possible to start with a high value of K and to keep this value constant throughout the adjustment program. However, the adjustment program with a value of K which varies during the program as described in the foregoing has the advantage that the amplitude of the translator vibration is always very low.

Further, it is to be noted that in the adjustment program described above that value of ROPOS is searched for which the ratio between the amplitude of the translator vibration and K is zero. It will also be evident that, in principle, it is also possible to determine that value of ROPOS for which this ratio is maximal. However, determining the zero point in the ratio can be performed more accurately because the change of said ratio in the proximity of the zero point is substantially larger than in the proximity of the maximum of this ratio.

Finally, it is to be noted that the invention described in the foregoing may also be applied to drive arrangements comprising rotary synchronous motors instead of linear synchronous motors as described above.

I claim:

1. In a drive arrangement having a multi-phase synchronous motor comprising a stator and a movable element having a plurality of phase windings in electromagnetic coaction with said stator, means for outputting a position value of the movable element relative to the stator and for incrementing or decrementing the position value depending on the direction of movement of said movable element, and energizing means for generating in said phone windings energizing currents whose values are periodic functions of the position of said movable element, each of the periods of the functions corresponding to a displacement of said movable element of 360 electrical degrees and the phase difference between the energizing currents defined by the periodic functions being constant, wherein the improvement comprises:

adjustment means for adjusting the position value prior to activation of said energizing means to an initial position value for which the energizing currents defined by said initial position value produce a maximal force on said movable element upon activation of said motor energizing system, said adjustment means comprising signal generating means for generating measurement alternating currents in consecutive different phase windings in successive time intervals for inducing a vibration of said movable element having an amplitude small relative to the period of said periodic functions, the measurement alternating currents generated in each phase winding having amplitudes equal to a gain factor times the function value for the respective phase winding of a plurality of different auxiliary position values for producing said vibration of said movable element, means for determining the optimum auxiliary position value for which the ratio between the amplitude of the vibration and the gain factor is maximal for a predetermined relationship between the signs of the measurement alternating currents and the directions of the forces on said movable element generated by the measurement alternating currents, and means for adjusting said initial position value to said optimum auxiliary position value.

2. A drive arrangement as claimed in claim 1, wherein said synchronous motor is a rotary motor and said movable element is a rotor.

3. A drive arrangement as claimed in claim 1, wherein said synchronous motor is a linear motor and said movable element is a rotor.

4. A drive arrangement as claimed in claim 1, wherein said movable element comprises three phase windings.

5. A drive arrangement as claimed in claim 1, characterized in that said adjustment means comprises means for determining the auxiliary position value for which the ratio between the amplitude of the vibration and the gain factor is minimal and for determining the initial position value by changing said auxiliary position value by a value corresponding to a displacement of said movable element of ninety electrical degrees.

6. A drive arrangement as claimed in claim 5, characterized in that said adjustment means comprises means for iteratively determining the optimum auxiliary position value.

7. A drive arrangement as claimed in claim 6, characterized in that the adjustment means comprises means for incrementing the value of the gain factor as the ratio between the amplitude of the vibration and the value of the gain factor decreases.

8. A drive arrangement as claimed in claim 5, characterized in that the adjustment means comprises means for incrementing the value of the gain factor as the ratio between the amplitude of the vibration and the value of the gain factor decreases.

9. In a motor energizing system for a drive arrangement comprising a synchronous motor having a stator and a movable element with a plurality of phase windings in electromagnetic coaction with the stator and means for outputting a position value of the movable element relative to the stator and for incrementing or decrementing the position value depending on the direction of movement of the movable element, said motor energizing system comprising energizing means for generating energizing currents in the phase windings of the movable element which energizing currents are periodic functions of the position of the movable element relative to the stator, each of the periods of the periodic functions corresponding to a displacement of said movable element of 360 electrical degrees and the phase difference between the energizing currents defined by the periodic functions being constant, wherein the improvement in the motor energizing system comprises:

adjustment means for adjusting the position value prior to activation of said energizing means to an initial position value for which the energizing currents defined by said initial position value produce a maximal force on said movable element upon activation of said energizing means, said adjustment means comprising signal generating means for generating measurement alternating currents in consecutive different phase windings in successive time intervals for inducing a vibration of said movable element having an amplitude small relative to the period of said periodic functions, the measurement alternating currents generated in each phase winding having amplitudes equal to a gain factor times the function value for the respective phase winding of a plurality of different auxiliary position values for producing said vibration of said movable element, means for determining the optimum auxiliary value for which the ratio between the amplitude of the vibration and the gain factor is maximal for a predetermined relationship between the signs of the measurement alternating currents and the directions of the forces on the movable element generated by said measurement alternating currents, and means for adjusting the initial position value to said optimum auxiliary position value.

10. A motor energizing system as claimed in claim 9, wherein said adjustment means comprises means for determining the auxiliary position value for which the ratio between the amplitude of the vibration and the gain factor is minimal and for determining the initial position value by changing said auxiliary position value by a value corresponding to a displacement of said movable element of ninety electrical degrees.

11. A motor energizing system as claimed in claim 10, wherein the adjustment means comprises means for iteratively determining the optimum auxiliary position value.

12. A motor energizing system as claimed in claim 11, wherein the adjustment means comprises means for incrementing the value of the gain factor as the ratio between the amplitude of the vibration and the value of the gain factor decreases.

13. A motor energizing system as claimed in claim 10, wherein the adjustment means comprises means for incrementing the value of the gain factor as the ratio between the amplitude of the vibration and the value of the gain factor decreases.

* * * * *